United States Patent
Lin

(10) Patent No.: US 7,817,916 B2
(45) Date of Patent: Oct. 19, 2010

(54) CAMERA MODULE

(75) Inventor: Tsung-Yu Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/475,551

(22) Filed: May 31, 2009

(65) Prior Publication Data
US 2009/0304373 A1 Dec. 10, 2009

(30) Foreign Application Priority Data
Jun. 5, 2008 (CN) .................. 2008 1 0302040

(51) Int. Cl.
G03B 41/00 (2006.01)
(52) U.S. Cl. .................. 396/334; 348/262; 359/819
(58) Field of Classification Search ................. 396/114, 396/115, 332, 334; 348/262, 263, 265; 359/819
See application file for complete search history.

(56) References Cited

U.S. PATENT DOCUMENTS

| 632,573 | A | * | 9/1899 | Ives | ................... | 396/309 |
| 2007/0146530 | A1 | * | 6/2007 | Nose | ................... | 348/335 |
| 2008/0143829 | A1 | * | 6/2008 | Takeda | ................... | 348/143 |
| 2009/0195896 | A1 | * | 8/2009 | Tsai | ................... | 359/819 |

* cited by examiner

Primary Examiner—W. B. Perkey
Assistant Examiner—Fang-Chi Chang
(74) Attorney, Agent, or Firm—Raymond J. Chew

(57) ABSTRACT

A camera module includes a substrate, an image sensor, a shell, and at least two lens modules. The image sensor comprises at least two image sensor portions connecting with each other via a connecting portion. The at least two image sensor portions are mounted on the substrate. The connecting portion is separated from the substrate. The shell is mounted on the substrate and has a chamber for receiving the image sensor. The lens modules are each mounted in the shell corresponding to the image sensor portions. The lens module captures and transmits images to the image sensor portion of the image sensor.

7 Claims, 2 Drawing Sheets

CAMERA MODULE

BACKGROUND

1. Technical Field

The present disclosure relates to optical imaging devices, and particularly to a camera module.

2. Description of Related Art

A camera module often includes a substrate, a lens module and an image sensor. The lens module and the image sensor are mounted on the substrate. The lens module has an inner chamber receiving the image sensor therein. The lens module is configured for capturing an image facing the lens. Range of the camera module is limited, such that to capture an image outside the camera module range, the camera module must be relocated.

DETAILED DESCRIPTION

Figure 1:
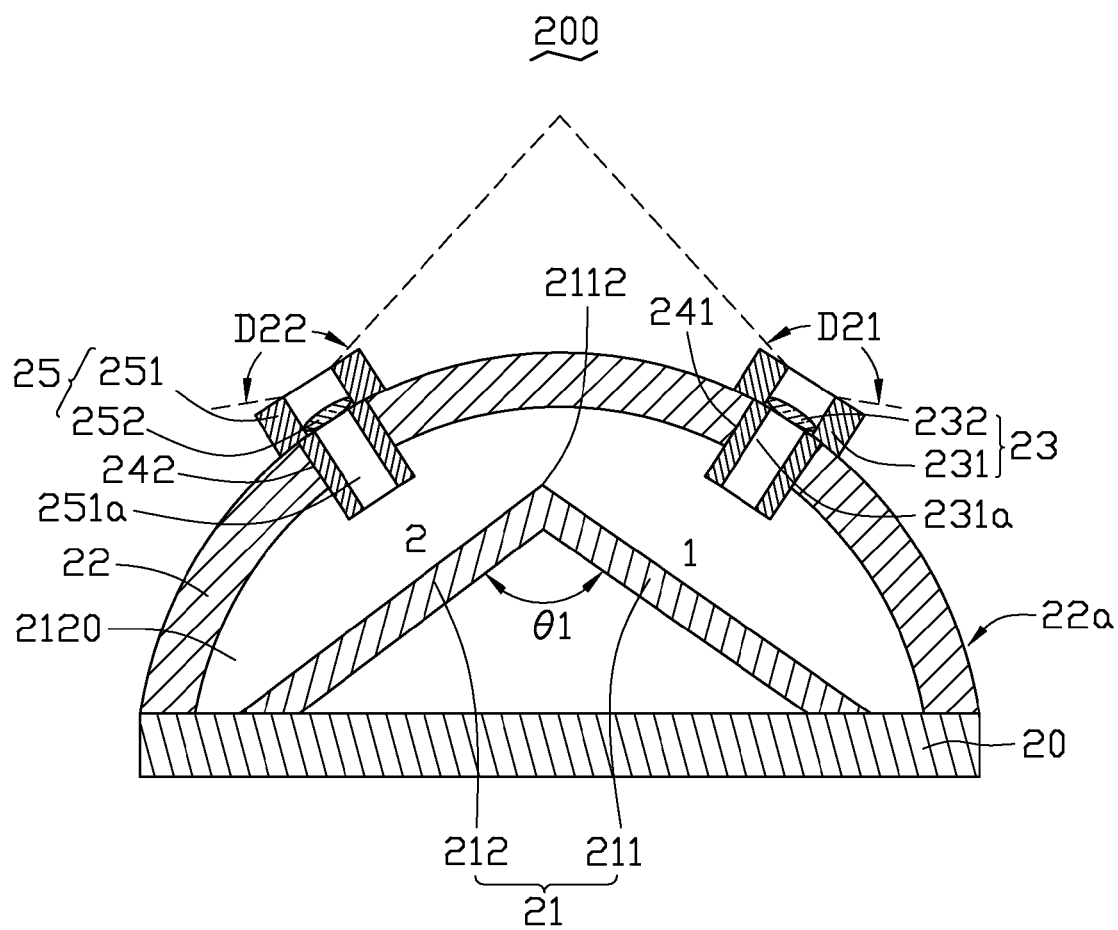
FIG. 1 is a sectional view of a first embodiment of a camera module.

Referring to FIG. 1, a first embodiment of a camera module 200 includes a substrate 20, an image sensor 21, a shell 22, a first lens module 23 and a second lens module 25.

Depending on the embodiment, the substrate 20 is selected from the group consisting of fiberglass, reinforced plastic, and ceramic.

The image sensor 21 includes a first image sensor portion 211 and a second image sensor portion 212 connecting with the first image sensor portion 211.

The first image sensor portion 211 and the second image sensor portion 212 are planar-shape. The first image sensor portion 211 and the second image sensor portion 212 are mounted on the substrate 20 and form an inverted V. A connecting portion 2112 of the first image sensor portion 211 and the second image sensor portion 212 is separated from the substrate 20. An included angle θ1 of the connecting portion 2112 is between 120° and 160°.

The shell 22 has a curved surface 22a. The shell 22 is mounted on the substrate 20 and defines a chamber 2120 receiving the image sensor 21 therein. Two through holes 241, 242 are defined in the shell 22 corresponding to the two image sensor portions 211, 212 respectively.

Each lens module 23, 25 includes a lens 232, 252 and a barrel 231, 251 having an inner chamber 231a, 251a for receiving the lens 232, 252 therein. The first lens module 23 is mounted in the through hole 241. The second lens module 25 is mounted in the through hole 242.

The first lens module 23 corresponds to the first image sensor portion 211 of the image sensor 21. An image captured by the first lens module 23 is directly transmitted to the first image sensor portion 211 of the image sensor 21 without optical fiber. The second lens module 25 corresponds to the second image sensor portion 212 of the image sensor 21. An image captured by the second lens module 25 is directly transmitted to the first image sensor portion 212 of the image sensor 21 without optical fiber.

A first image capture range D21 of the first lens module 23 is configured for capturing the image in the lens range of the camera module 200. A second image capture range D22 of the second lens module 25 is configured for capturing the image to the left of the lens range of the camera module 200. An image capture range of the camera module 200 is added to the image capture range D21 and the image capture range D22. The camera module 200 has an increased image capture range without requiring relocation.

It should be noted that the two image sensor portions 211, 212 of the image sensor 21 can be two independent image sensors mounted on the substrate 20 in an inverted V-shape. An included angle of the two independent sensors is between 120° and 160°.

Figure 2:
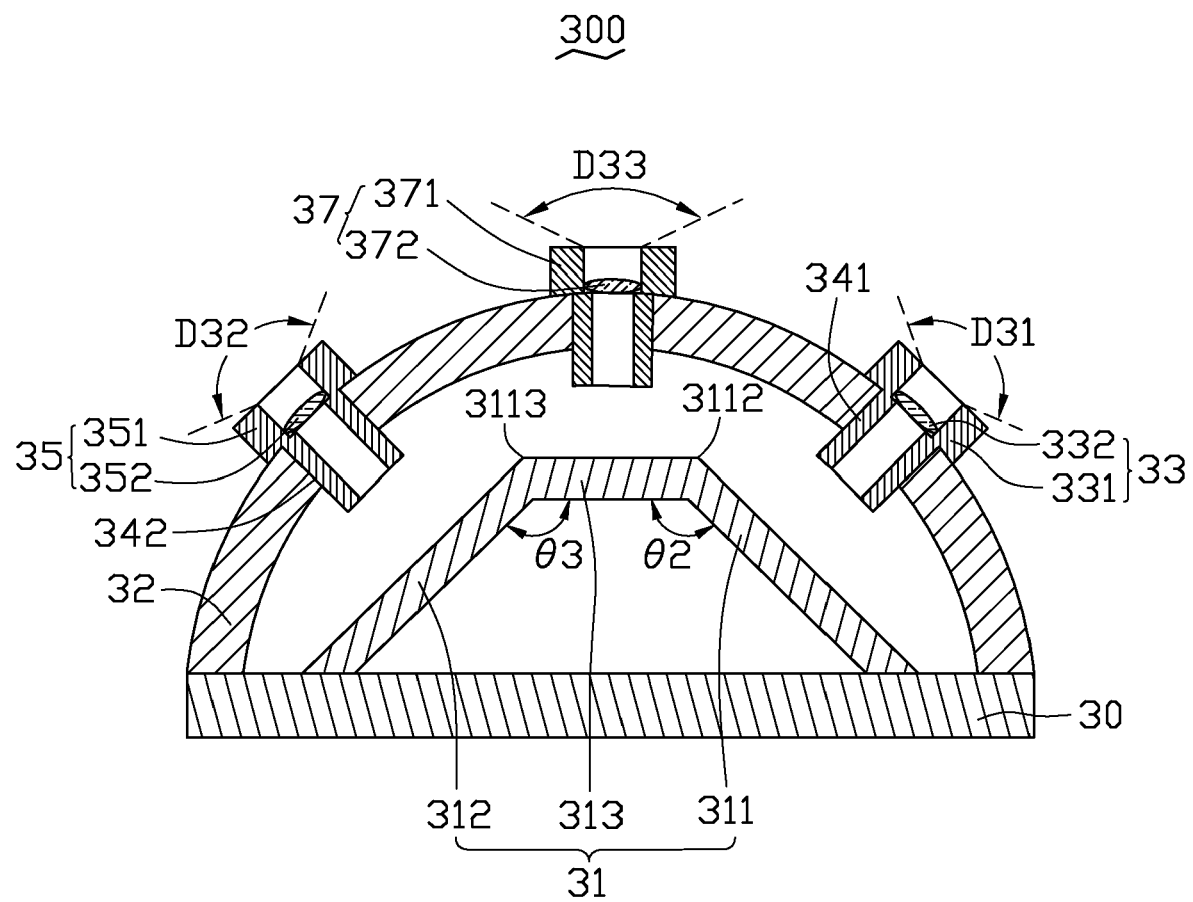
FIG. 2 is a sectional view of a second embodiment of a camera module.

FIG. 2 illustrates a camera module 300 of a second embodiment. The camera module 300 includes a substrate 30, a image sensor 31, a shell 32, a first lens module 33, a second lens module 35 and a third lens module 37.

The image sensor 31 includes a first image sensor portion 311, a second image sensor portion 312 and a third image sensor portion 313. The third image sensor portion 313 is interconnected between the first image sensor portion 311 and the second image sensor portion 312. The third image sensor portion 313 is parallel to the substrate 30. The first image sensor portion 311 and the second image sensor portion 311 are mounted on the substrate 30. A connecting portion 3112 of the first image sensor portion 311 and the third image sensor portion 313 is separated from the substrate 30. An included angle θ2 of connecting portion 3112 is between 120° and 160°. A connecting portion 3113 of the second image sensor portion 312 and the third image sensor portion 313 is separated from the substrate 30. An included angle θ3 of connecting portion 3113 is between 120° and 160°.

Three through holes 341, 342 or 343 are defined in the shell 32 corresponding to the three image sensor portion 311, 312 or 313 respectively. Each lens module 33, 35 or 37 is mounted in each through hole 341, 342 or 343. The first lens module 33 corresponds to the first image sensor portion 311 of the image sensor 31. An image captured by the first lens module 33 is directly transmitted to the first image sensor portion 311 of the image sensor 31 without optical fiber. The second lens module 35 corresponds to the second image sensor portion 312 of the image sensor 31. An image captured by the second lens module 35 is directly transmitted to the second image sensor portion 312 of the image sensor 31 without optical fiber. The third lens module 37 corresponds to the third image sensor portion 313 of the image sensor 31. An image captured by the third lens module 37 is directly transmitted to the third image sensor portion 313 of the image sensor 31 without optical fiber.

A first image capture range D31 of the first lens module 33 is configured for capturing images on the right side of the lens range of the camera module 300. A second image capture range D32 of the second lens module 35 is configured for capturing images on the left side of the image range of the camera module 300. A third image capture range D33 of the third lens module 37 is configured for capturing images in the lens range of the camera module 300. An image capture of the camera module 300, in addition to the image capture range D31, is enhanced by the second image capture range D32 and the third image capture range D33. The camera module 300 thus improves its image capture range without relocation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera module, comprising:
   a substrate;
   an image sensor comprising at least two image sensor portions connecting with each other via a connecting portion, the at least two image sensor portions cooperatively mounted on the substrate, the connecting portion being separated from the substrate;
   a shell mounted on the substrate and defining a chamber for receiving the image sensor;
   at least two lens modules each mounted in the shell corresponding to the at least two image sensor portions respectively, the lens module configured to capture and transmit images to the image sensor portion of the image sensor.

2. The camera module of claim 1, wherein the shell comprises a curved surface, the shell defining at least two through holes corresponding to the at least two image sensor portions for receiving the at least two lens modules.

3. The camera module of claim 1, wherein an included angle of the connecting portion is between 120° and 160°.

4. The camera module of claim 1, wherein each image sensor portion is planar.

5. The camera module of claim 1, wherein each lens module comprises a lens and a barrel comprising an inner chamber receiving the lens.

6. The camera module of claim 1, wherein an image captured by each lens module is directly transmitted to the each image sensor portion of the image sensor.

7. The camera module of claim 1, wherein the substrate is selected from the group consisting of fiberglass, reinforced plastic, and ceramic.

* * * * *